(12) United States Patent
Zollinger et al.

(10) Patent No.: US 8,756,708 B2
(45) Date of Patent: Jun. 17, 2014

(54) SYSTEM AND METHOD FOR DETECTING ACTIVE STREAMS USING A HEARTBEAT AND SECURE STOP MECHANISM

(75) Inventors: James Mitch Zollinger, San Jose, CA (US); Julie Amundson Pitt, Livermore, CA (US)

(73) Assignee: Netflix Inc., Los Gatos, CA (US)

( * ) Notice: Subject to any disclaimer, the term of this patent is extended or adjusted under 35 U.S.C. 154(b) by 0 days.

(21) Appl. No.: 13/549,302

(22) Filed: Jul. 13, 2012

(65) Prior Publication Data

US 2014/0020119 A1   Jan. 16, 2014

(51) Int. Cl.
    *H04L 29/06* (2006.01)
(52) U.S. Cl.
    USPC .............................................. 726/30; 713/173

(58) Field of Classification Search
    USPC .......................................................... 726/30
    See application file for complete search history.

(56) References Cited

U.S. PATENT DOCUMENTS

| | | | |
|---|---|---|---|
| 7,451,359 B1 * | 11/2008 | Coekaerts | 714/48 |
| 2005/0262573 A1 * | 11/2005 | Bo et al. | 726/27 |
| 2007/0083620 A1 * | 4/2007 | Pedersen | 709/219 |

* cited by examiner

*Primary Examiner* — Yogesh Paliwal
(74) *Attorney, Agent, or Firm* — Patterson & Sheridan, LLP

(57) ABSTRACT

One embodiment of the present invention sets forth a technique for identifying active streaming connections associated with a particular user account. Each active streaming connection transmits heartbeat packets periodically to a server that tracks the receipt of the heartbeat packets. If, for a particular streaming connection, the server stops receiving heartbeat packets, then the server is able to infer that the streaming connection has been terminated.

13 Claims, 5 Drawing Sheets

SYSTEM AND METHOD FOR DETECTING ACTIVE STREAMS USING A HEARTBEAT AND SECURE STOP MECHANISM

BACKGROUND OF THE INVENTION

1. Field of the Invention

Embodiments of the present invention relate generally to digital media distribution and, more specifically, to a system and method for detecting active streams using a heartbeat and secure stop mechanism.

2. Description of the Related Art

Digital content distribution systems conventionally include a content server, a content player, and a communications network connecting the content server to the content player. The content server is configured to store digital content files that can be downloaded from the content server to the content player. Each digital content file corresponds to a specific identifying title, such as "Gone with the Wind," that a user can download for playback. The digital content file typically includes sequential content data, organized according to playback chronology, and may comprise audio data, video data, or a combination thereof.

The content player is configured to download and play a digital content file, in response to a user request selecting the title for playback. The process of playing the digital content file includes decoding and rendering audio and video data into an audio signal and a video signal, which may drive a display system having a speaker subsystem and a video subsystem. Playback typically involves a technique known in the art as "streaming," whereby the content server sequentially transmits the digital content file to the content player, and the content player plays the digital content file while content data is received that comprises the digital content file.

Typically, in a digital content distribution system, a limit is placed on the number of concurrent streaming connections a particular user is allowed to establish. To enforce such a limit, when a user requests a new streaming connection, the number of currently established streaming connections associated with that user is observed, and if that number exceeds the maximum number of allowed concurrent streaming connections, then the request for the new streaming connection is denied.

In practice, oftentimes a previous streaming connection established by the user is terminated by the content player but the notification of the termination event is not received by the content server in a timely manner. This results in inaccurate and stale state information being stored on the content server related to the user, which may impact the user's viewing experience. For example, a user who has legitimately terminated a particular streaming connection may not be allowed to establish any new streaming connections if the content server does not know that the particular streaming connection has been terminated. Not allowing users to establish new streaming connections when those users are in compliance with the limitations placed on concurrent streaming connections can run the user experience and is, thus, highly undesirable in a content distribution system.

As the foregoing illustrates, what is needed in the art is a way to more accurately track active and terminated streaming connections.

SUMMARY OF THE INVENTION

One embodiment of the present invention sets forth a method for determining whether a streaming connection is active. The method includes the steps of receiving a first heartbeat packet from an endpoint device through which the streaming connection is established, where the first heartbeat packet in indicates that the streaming connection is active, and waiting to receive a secure stop event indicating that the streaming connection is no longer active. The method also includes the steps of determining that no additional heartbeat packets have been received from the endpoint device and that the secure stop event was not received, and in response, determining that the streaming connection is inactive.

Another embodiment of the present invention sets forth a method of establishing a streaming connection. The method includes the steps of receiving a request from an endpoint device to establish a streaming connection associated with a user account, and determining a number of active streaming connections associated with the user account based on a most recent heartbeat packet recorded for each known streaming connection. The method also includes the step of, if the number of active streaming connections is greater than or equal to a predetermined threshold, then denying the request, or, if the number of active streaming connections is less than a predetermined threshold, then establishing the streaming connection.

One advantage of the disclosed technique is that, when a secure stop event indicating the termination of a streaming connection has not been received by the application server, the application server is able to infer the termination of the streaming connection via the heartbeat tracking mechanism. Without such a mechanism, a user would be blocked from establishing a new streaming connection any time a previously established streaming connection is not properly terminated.

Further, when a secure stop event is received, the application server is able to verify that marking an active stream as inactive as a result of a loss of a heartbeat was a valid decision. More specifically, if the secure stop event and the loss of heartbeat can be correlated, then the active stream was legitimately marked as inactive. However, if the loss of heartbeat and the secure stop event cannot be correlated, i.e., the time difference between the receipt of the last heartbeat and when the secure stop event was raised is sufficiently large, then the active stream was not legitimately marked as inactive. In such a scenario, the application through which the stream was established may have been hacked. Thus, through the secure stop mechanism combined with the heartbeat mechanism, the application server is able to identify suspicious behavior on the application. Once an application has been identified as exhibiting suspicious behavior, the application server may enforce a more stringent deactivation policy for active streams established through the application. More specifically, the application server may not mark an active stream established through the application until a secure stop event has been received.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
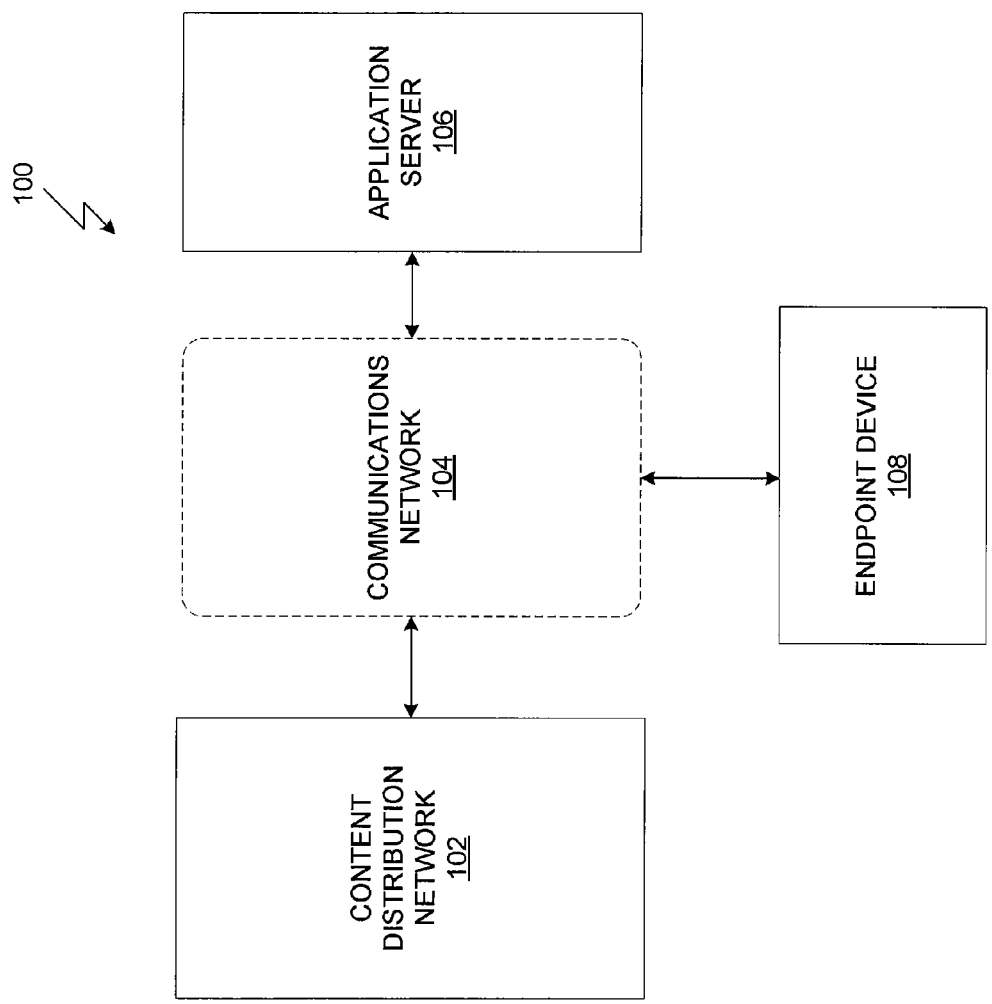
FIG. 1 illustrates a content distribution system configured to implement one or more aspects of the present invention.

FIG. 1 illustrates a content distribution system 100 configured to implement one or more aspects of the invention. As shown, the content distribution system 100 includes a content distribution network (CDN) 102, a communications network 104, an application server 106 and an endpoint device 108.

The communications network 104 includes a plurality of network communications systems, such as routers and switches, configured to facilitate data communication between the CDN 102, the application server 106 and the endpoint device 108. Persons skilled in the art would recognize that many technically feasible techniques exist for building the communications network 104, including technologies practiced in deploying the well-known internet communications network.

The endpoint device 108 comprises a computer system, a set top box, a mobile device such as a mobile phone, or any other technically feasible computing platform that has network connectivity and is coupled to or includes a display device and speaker device for presenting video frames, and generating acoustic output, respectively.

The CDN 102 comprises one or more computer systems configured to serve download requests for digital content files received from the endpoint device 108. The digital content files may reside on a mass storage system accessible to the computer system. The mass storage system may include, without limitation, direct attached storage, network attached file storage, or network attached block-level storage. The digital content files may be formatted and stored on the mass storage system using any technically feasible technique. A data transfer protocol, such as the well-known hyper-text transfer protocol (HTTP), may be used to download digital content files from the CDN 102 to the endpoint device 108.

The application server 106 is a computer system configured to host an application that is accessed by the endpoint device 108. The application hosted by the application server 102 allows a user of the endpoint device 108 to browse through available digital content, manage account information, receive content recommendations, establish a streaming connection, etc. A user of the endpoint device 108 is associated with a user account using which the user accesses the application server 106.

Although, in the above description, the content distribution system 100 is shown with one endpoint device 108 and one CDN 102, persons skilled in the art will recognize that the architecture of FIG. 1 contemplates only an exemplary embodiment of the invention. Other embodiments may include any number of endpoint devices 108 and/or CDNs 102. Thus, FIG. 1 is in no way intended to limit the scope of the present invention in any way.

Figure 2:
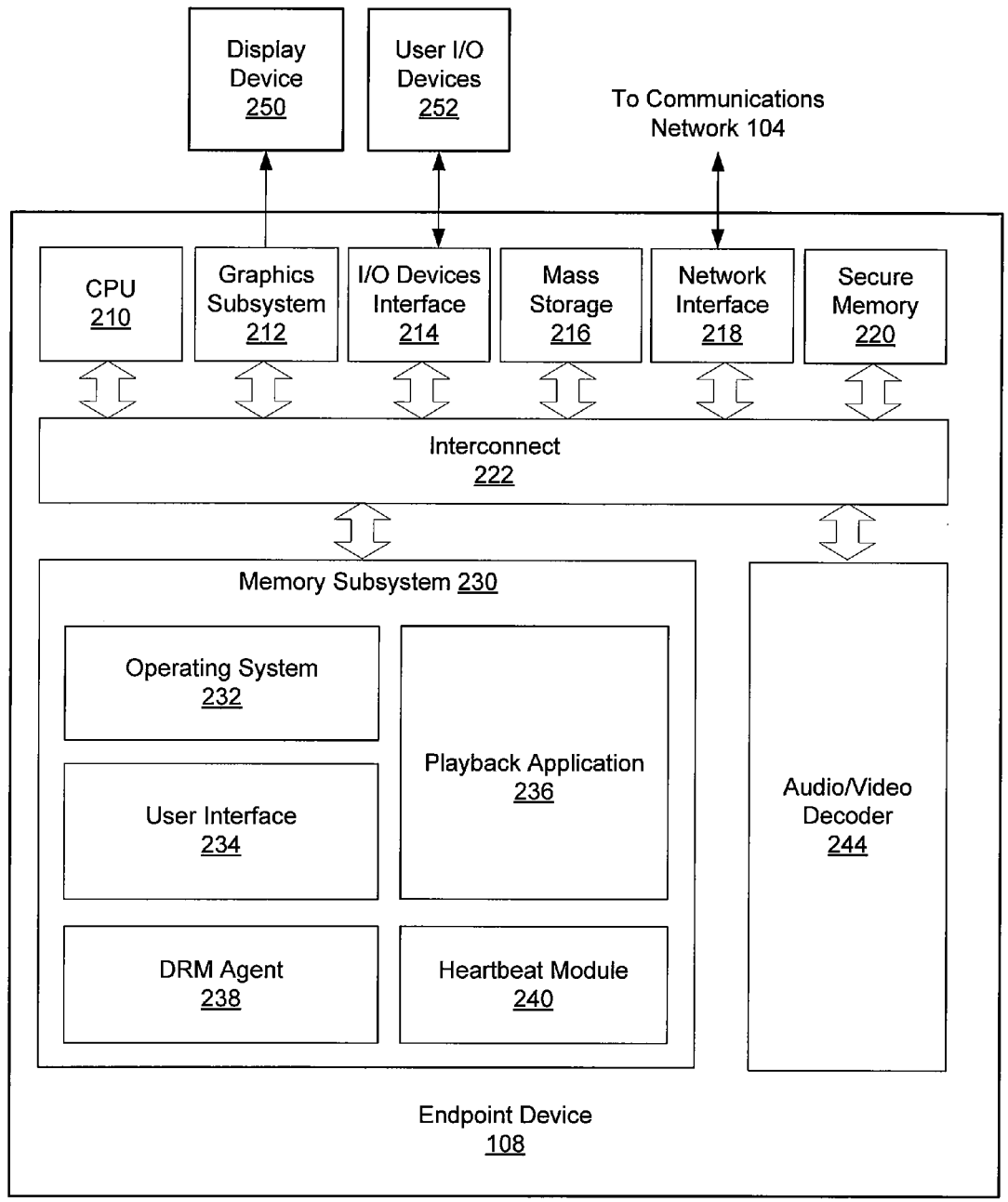
FIG. 2 is a more detailed view of the endpoint device of FIG. 1, according to one embodiment of the invention.

FIG. 2 is a more detailed view of the endpoint device 108 of FIG. 1, according to one embodiment of the invention. As shown, the endpoint device 108 includes, without limitation, a central processing unit (CPU) 210, a graphics subsystem 212, an input/output (I/O) device interface 214, a network interface 218, a secure memory space 220, an interconnect 222, a memory subsystem 230 and an audio/video decoder 244. The endpoint device 108 may also include a mass storage unit 216.

The CPU 210 is configured to retrieve and execute programming instructions stored in the memory subsystem 230. Similarly, the CPU 210 is configured to store and retrieve application data residing in the memory subsystem 230. The interconnect 222 is configured to facilitate transmission of data, such as programming instructions and application data, between the CPU 210, graphics subsystem 212, I/O devices interface 214, mass storage 216, network interface 218, secure memory space 220 and memory subsystem 230.

The graphics subsystem 212 is configured to generate frames of video data and transmit the frames of video data to display device 250. In one embodiment, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 222. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 104. In one embodiment, the network interface 218 is configured to communicate using the well-known Ethernet standard. The network interface 218 is coupled to the CPU 210 via the interconnect 222.

The memory subsystem 230 includes programming instructions and data that comprise an operating system 232, a user interface 234, a playback application 236, a digital rights management (DRM) agent 238 and a heartbeat module 240. The operating system 232 performs system management functions such as managing hardware devices including the network interface 218, mass storage unit 216, I/O device interface 214 and graphics subsystem 212. The operating system 232 also provides process and memory management tools for the user interface 234 and the playback application 236. The user interface 234 provides a specific structure, such as a window and object metaphor, for user interaction with endpoint device 108. Persons skilled in the art will recognize the various operating systems and user interfaces that are well-known in the art and suitable for incorporation into the endpoint device 108.

The playback application 236 is configured to establish a streaming connection (referred to herein as the "streaming connection") with the application server 106 using a user account associated with a particular set of users. Once the streaming connection is established, the playback application is configured to retrieve digital content selected by the user from a CDN 102 for playback. The playback application 236 is configured to interact with the DRM agent 238 so that the retrieved digital content is decrypted and rendered.

In operation, the playback application 236 transmits to the application server 106 a request for a DRM license that includes a DRM challenge associated with the digital content file selected by the user for playback. The application server 106, upon receiving the DRM challenge, transmits a DRM license associated with the digital content file to the playback application 236. In one embodiment, the DRM license includes the decryption key needed to decrypt the encrypted digital content file. Upon receipt of the DRM license, the playback application 236 transmits the DRM license to the DRM agent 238.

Again, the playback application 236 is configured to retrieve encrypted digital content from the CDN 102. Once the encrypted digital content is retrieved from the CDN 102, the playback application 236 transmits the encrypted digital content to the DRM agent 238 for decryption and rendering. The DRM agent 238, in turn, initiates and/or performs decryption operations on the encrypted digital content using the DRM license. The DRM agent 238 then transmits a request to the audio/video decoder 244 to render the decrypted digital content.

In the case of video data, the audio/video decoder 244 reads units of video data from the secure memory space 220, and renders the units of video data into a sequence of video frames corresponding in duration to the fixed span of playback time. The sequence of video frames is processed by graphics subsystem 212 and transmitted to the display device 250. In the case of audio data, the audio/video decoder 244 reads units of audio data from the secure memory space 220, and renders the units of audio data into a sequence of audio samples, generally synchronized in time with the sequence of video frames. In one embodiment, the sequence of audio samples is transmitted to the I/O device interface 214, which converts the sequence of audio samples into the electrical audio signal. The electrical audio signal is transmitted to the speaker within the user I/O devices 252, which, in response, generates an acoustic output.

While the streaming connection is active, i.e., while data is being retrieved from the CDN 102, the heartbeat module 108 periodically transmits heartbeat packets to the application server 106. Each heartbeat packet indicates to the application server 106 that the streaming connection is still active. In one embodiment, a heartbeat packet includes an identifier associated with the streaming connection, an identifier associated with the user account through which the connection to the application server 106 was established and a timestamp. In one embodiment, a heartbeat packet does not include a timestamp and the application server 106 stores the time of receipt upon receiving the heartbeat packet from the heartbeat module 108. As discussed below in conjunction with FIG. 3, the application server 106 monitors and tracks the heartbeat packets received from the heartbeat module 108 to determine the current state of a streaming connection.

When the streaming connection is terminated, i.e., when data is no longer being retrieved from the CDN 102, the heartbeat module 108 stops transmitting heartbeat packets to the application server 106. In addition, the DRM agent 238 releases the DRM license that was being used to decrypt the retrieved data. At such a time, the DRM agent 238 also transmits a secure stop event to the application server 106 indicating to the application server 106 that the DRM license has been released and the streaming connection has been terminated.

In some situations, the secure stop event transmitted by the DRM agent 238 is not received by the application server 106 in a timely manner. For example, if the endpoint device 108 abruptly loses network connectivity or power, the streaming connection is terminated but the secure stop event raised by the DRM agent 238 may not be transmitted to the application server 106 at the time of the streaming connection termination. In such a scenario, the secure stop event is transmitted to the application server 106 by the DRM agent 238 at a later time when the conditions that barred the transmission are eliminated.

In one embodiment, the playback application 236 does not establish a new streaming connections with the application server 106 until the secure stop event indicating that a previous streaming connection was termination has been transmitted to the application server 106.

Figure 3:
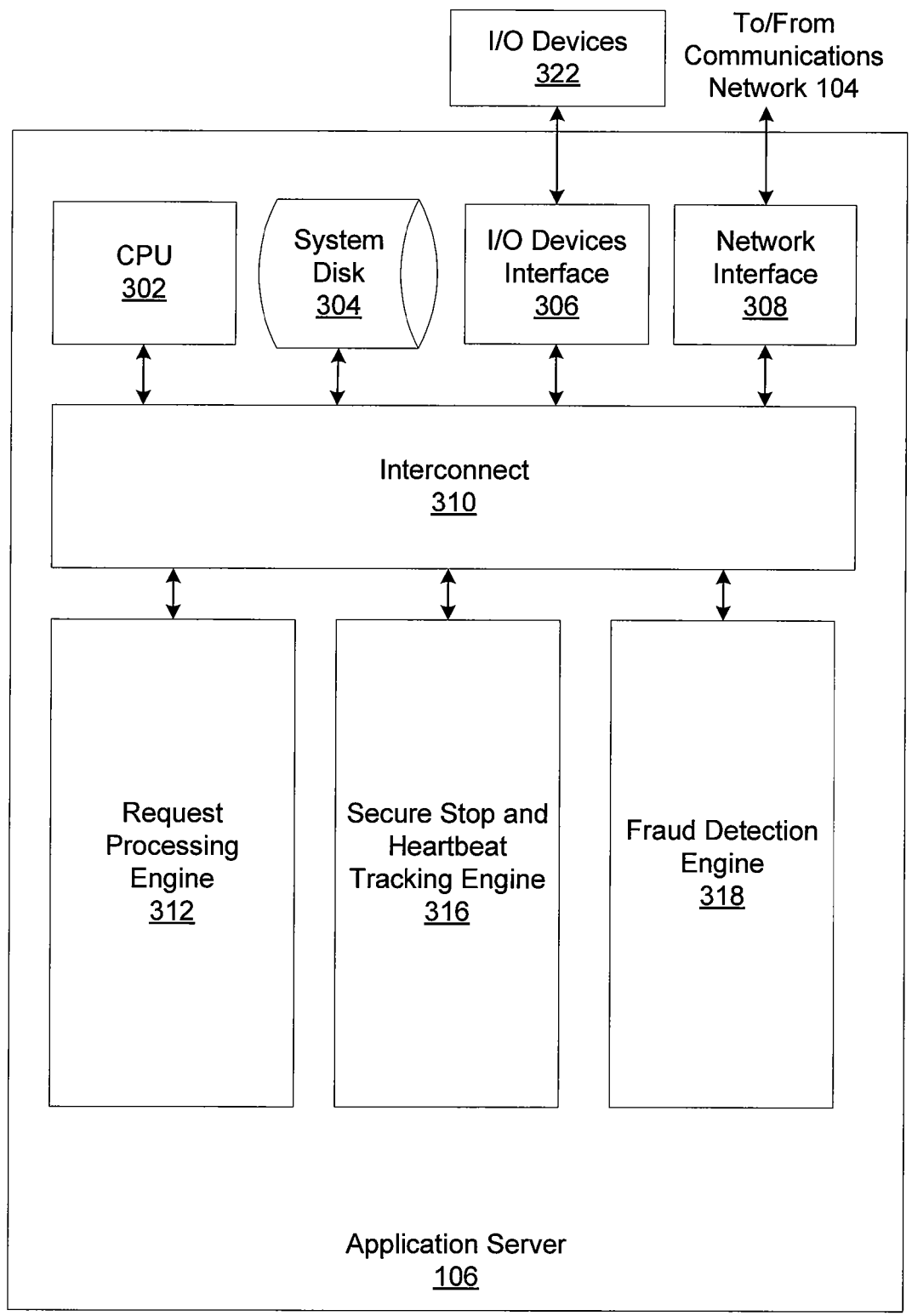
FIG. 3 is a more detailed view of the application server of FIG. 1, according to one embodiment of the invention.

FIG. 3 is a more detailed view of the application server 106 of FIG. 1, according to one embodiment of the invention. As shown, the application server includes a CPU 302, a system disk 304, I/O interfaces 306, a network interface 308, an interconnect 310, a request processing engine 312, a secure stop and heartbeat tracking engine 316 and a fraud detection engine 318.

The CPU 302 is configured to retrieve and execute programming instructions associated with the request processing engine 312, the secure stop and heartbeat tracking engine 316 and the fraud detection engine 318. The interconnect 310 is configured to facilitate transmission of data, such as programming instructions and application data, between the CPU 302, I/O devices interface 306, a system disk 304, network interface 308, the request processing engine 312, the secure stop and heartbeat tracking engine 316 and the fraud detection engine 318.

The input/output (I/O) device interface 306 is configured to receive input data from user I/O devices 322 and transmit the input data to the CPU 302 via the interconnect 310. For example, user I/O devices 322 may comprise one of more buttons, a keyboard, and a mouse or other pointing device. A system disk 304, such as a hard disk drive or flash memory storage drive, is configured to store non-volatile data. A network interface 308 is configured to transmit and receive packets of data via the communications network 104. In one embodiment, the network interface 308 is configured to communicate using the well-known Ethernet standard. The network interface 308 is coupled to the CPU 302 via the interconnect 310.

The request processing engine 312 is configured to receive requests from various endpoint devices, such as endpoint device 108. Such requests include requests for browsing through available digital content, managing user account information, receiving content recommendations and establishing a streaming connection. The request processing engine 312 processes the requests received from the various endpoint devices 108 and provides the requested information to the endpoint devices. In the case of a request for establishing a streaming connection associated with specific digital content, the request processing engine 312 transmits to the endpoint device information indicating how to retrieve the specific digital content from the CDN 102. In addition, as discussed above, the request processing engine 312 also transmits the DRM license associated with the digital content to the endpoint device.

The secure stop and heartbeat tracking engine 316 is configured to track the receipt of heartbeat packets and secure stop events received from endpoint devices. As described above, while a streaming connection is active, i.e., while data is being retrieved from the CDN 102, the heartbeat module 108 within the endpoint device 108 periodically transmits heartbeat packets to the application server 106. The heartbeat packets are received and recorded by the secure stop and heartbeat tracking engine 316. At periodic time intervals, the secure stop and heartbeat tracking engine 316 is configured to determine the last heartbeat packet that was received from the endpoint device 108. If the last heartbeat packet was received a threshold time period ago, then the secure stop and heartbeat tracking engine 316 is configured to record the termination of the streaming connection. In one embodiment, recording the termination of the streaming connection with the heartbeat packets cease to be received is a "soft termination."

As also described above, when the streaming connection is terminated, i.e., when data is no longer being retrieved from the CDN 102, the DRM agent 238 within the endpoint device 108 transmits a secure stop event to the application server 106 indicating that the streaming connection has been terminated. The secure stop event is received and recorded by the secure stop and heartbeat tracking engine 316. Once the secure stop event is received from the endpoint device 108, the secure stop and heartbeat tracking engine 316 is configured to record the termination of the streaming connection. In one embodiment, recording the termination of the streaming connection with the heartbeat packets cease to be received is a "soft termination."

Based on the recorded heartbeat packets and/or the recorded secure stop events, the secure stop and heartbeat tracking engine 316 is configured to identify the currently active streaming connections associated with a particular user account. More specifically, if the secure stop and heartbeat tracking engine 316 continuously receives heartbeat packets from an endpoint device 108, then the streaming connection associated with the endpoint device 108 and identified by the heartbeat packets is still active. Conversely, if the secure stop and heartbeat tracking engine 316 stops receiving heartbeat packets from the endpoint device 108 or receives a secure stop event from the endpoint device 108, then the streaming connection associated with the endpoint device 108 and identified by the heartbeat packets is terminated.

Figure 4:
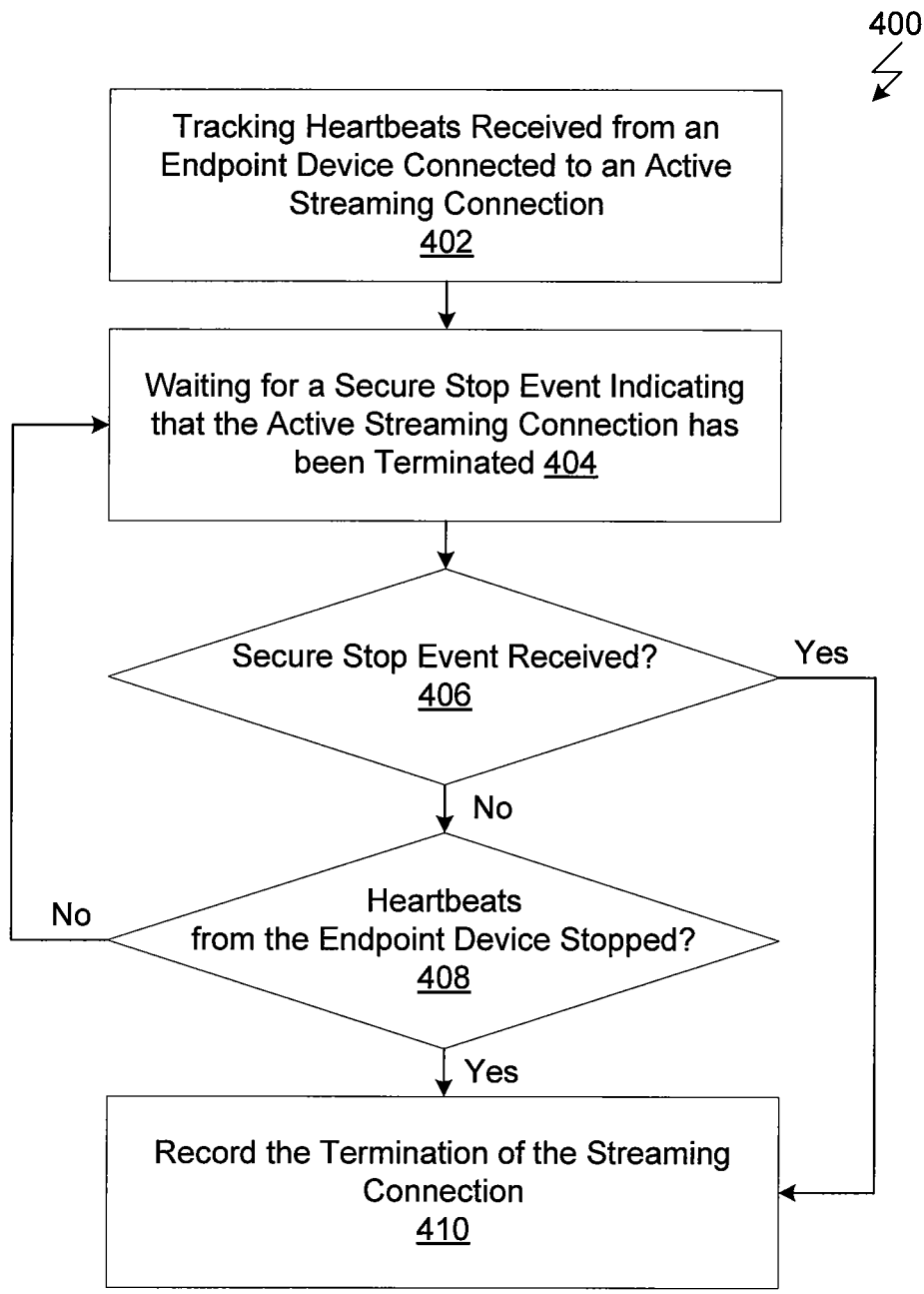
FIG. 4 is a flow diagram of method steps for tracking the receipt of heartbeats and a secure stop event from an active content stream, according to one embodiment of the invention.

FIG. 4 is a flow diagram of method steps for tracking the receipt of heartbeats and a secure stop event from an active streaming connection, according to one embodiment of the invention. Although the method steps are described in conjunction with the systems for FIGS. 1-3, persons skilled in the art will understand that any system configured to perform the method steps, in any order, is within the scope of the invention.

The method 400 begins at step 402, where the secure stop and heartbeat tracking engine 316 tracks the receipt of heartbeats received from an endpoint device 108 connected to an active streaming connection associated with a user account. At step 404, the secure stop and heartbeat tracking engine 316 waits for a secure stop event to be received from the endpoint device 108 indicating that the active streaming connection has been terminated.

At step 406, the secure stop and heartbeat tracking engine 316 determines whether a secure stop event has been received. If, at step 406, the secure stop and heartbeat tracking engine 316 determines that a secure stop event has not been received, then the method 400 proceeds to step 408. At step 408, the secure stop and heartbeat tracking engine 316 determines whether heartbeat packets are no longer being received from the endpoint device 108. In one embodiment, the secure stop and heartbeat tracking engine 316 makes such a determination by comparing the timestamp associated with the last heartbeat packet received and a current timestamp. If the difference between the two timestamps exceeds a pre-determined threshold value, then the secure stop and heartbeat tracking engine 316 determines that heartbeat packets are no longer being received from the endpoint device 108.

If, at step 408, the secure stop and heartbeat tracking engine 316 determines that heartbeat packets are being received from the endpoint device 108, then the method 400 returns to step 404 previously described herein. However, if, at step 408, the secure stop and heartbeat tracking engine 316 determines that heartbeat packets are no longer being received from the endpoint device 108, then the method 400 proceeds to step 410. At step 410, the secure stop and heartbeat tracking engine 316 records the termination of the active streaming connection. In such a manner, the secure stop and heartbeat tracking engine 316 is configured to record the termination of an active streaming connection when heartbeat packets are no longer being received from the endpoint device 108 connected to the streaming connection. If, at step 408, the secure stop and heartbeat tracking engine 316 determines that heartbeat packets are being received from the endpoint device 108, then the method 400 returns to step 404 previously described herein.

Referring back to step 406 now, if the secure stop and heartbeat tracking engine 316 determines that a secure stop event has been received, then the method 400 proceeds to step 410 previously described herein.

Figure 5:
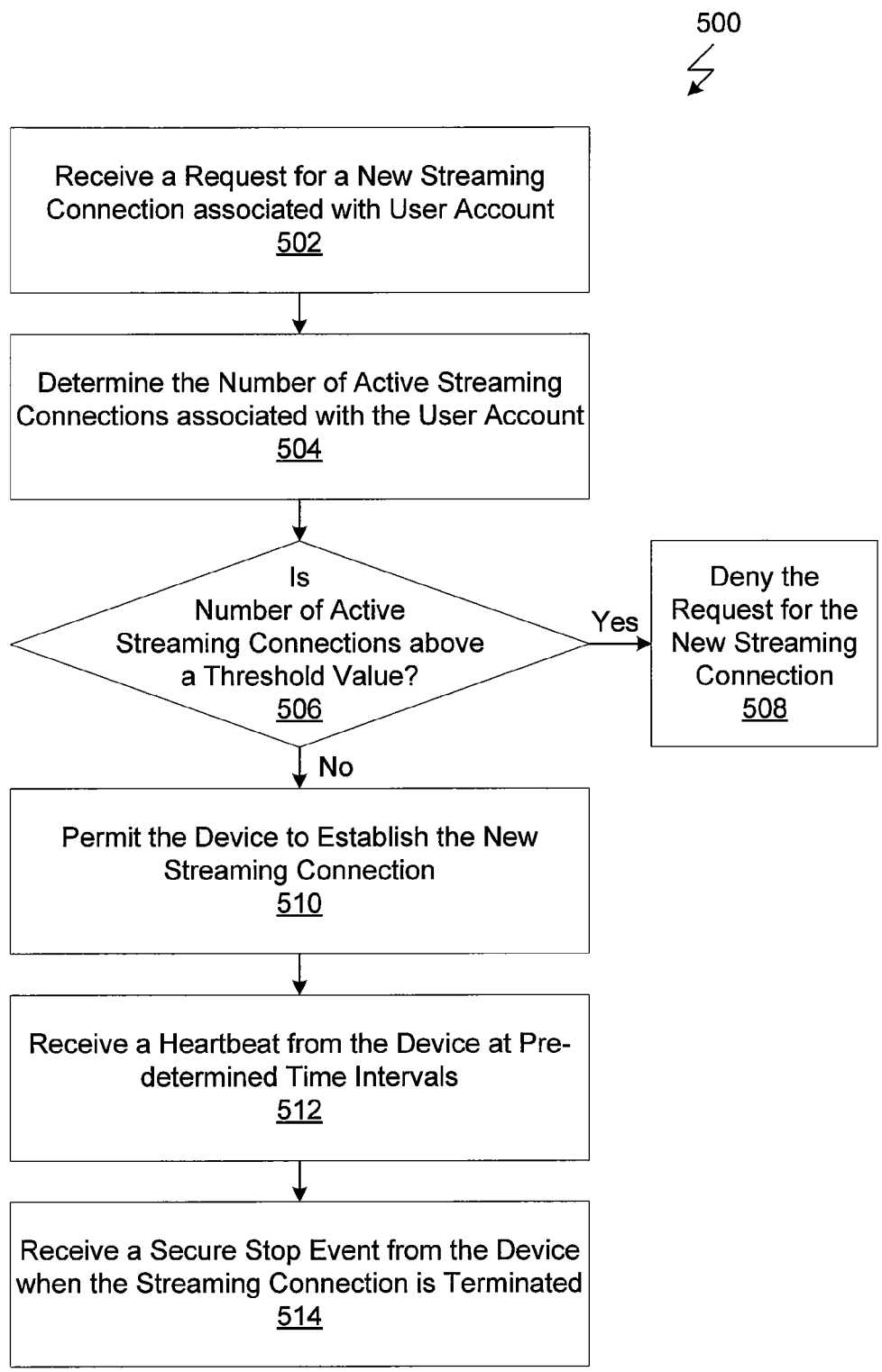
FIG. 5 is a flow diagram of method steps for establishing a new streaming connection, according to one embodiment of the invention.

FIG. 5 is a flow diagram of method steps for establishing a new streaming connection, according to one embodiment of the invention. Although the method steps are described in conjunction with the systems for FIGS. 1-3, persons skilled in the art will understand that any system configured to perform the method steps, in any order, is within the scope of the invention.

The method 500 begins at step 502, where the request processing engine 312 receives a request from the endpoint device 108 associated with a user account to establish a new streaming connection associated with specific digital content. At step 504, the request processing engine 312 determines the number of active streaming connections associated with the user account based on information tracked by the secure stop and heartbeat tracking engine 316. More specifically, the request processing engine 312 determines the number of streaming connections associated with the user account that have not been terminated. Again, the secure stop and heartbeat tracking engine 316 continues to receive heartbeat packets from endpoint devices that are connected to streaming connections that have not been terminated, i.e., active streaming connections.

At step 506, the request processing engine 312 determines whether the number of active streaming connections associated with the user account is above a threshold value. If, at step 506, the number active streaming connections is greater than or equal to a threshold value, then the method 500 proceeds to step 508, where the request processing engine 312 denies the request for establishing a new streaming connection. If, however, at step 506, the number active streaming connections is below the threshold value, then the method 500 proceeds to step 510.

At step 510, the request processing engine 312 permits the endpoint device 108 to establish the new streaming connection. In one embodiment, the request processing engine 312 transmits to the endpoint device 108 information indicating how to retrieve the specific digital content from the CDN 102. In addition, as discussed above, the request processing engine 312 also transmits the DRM license associated with the digital content to the endpoint device 108.

At step 512, the secure stop and heartbeat tracking engine 316 receives heartbeat packets from the endpoint device 108 at pre-determined time intervals. As discussed previously herein, the secure stop and heartbeat tracking engine 316 records the receipt of the heartbeat packets. At step 512, the secure stop and heartbeat tracking engine 316 receives a secure stop event from the endpoint device 108 when the streaming connection has been terminated. As discussed previously herein, the secure stop and heartbeat tracking engine 316 records the receipt of the secure stop event.

One advantage of the disclosed technique is that, when a secure stop event indicating the termination of a streaming connection has not been received by the application server, the application server is able to infer the termination of the streaming connection via the heartbeat tracking mechanism. Without such a mechanism, a user would be blocked from establishing a new streaming connection any time a previously established streaming connection is not properly terminated.

Further, when a secure stop event is received, the application server is able to verify that marking an active stream as inactive as a result of a loss of a heartbeat was a valid decision. More specifically, if the secure stop event and the loss of heartbeat can be correlated, then the active stream was legitimately marked as inactive. However, if the loss of heartbeat and the secure stop event cannot be correlated, i.e., the time difference between the receipt of the last heartbeat and when the secure stop event was raised is sufficiently large, then the active stream was not legitimately marked as inactive. In such a scenario, the application through which the stream was established may have been hacked. Thus, through the secure stop mechanism combined with the heartbeat mechanism, the application server is able to identify suspicious behavior on the application. Once an application has been identified as exhibiting suspicious behavior, the application server may enforce a more stringent deactivation policy for active streams established through the application. More specifically, the application server may not mark an active stream established through the application until a secure stop event has been received.

One embodiment of the invention may be implemented as a program product stored on computer-readable storage media within the endpoint device 108. In this embodiment, the endpoint device 108 comprising an embedded computer platform such as a set top box. An alternative embodiment of the invention may be implemented as a program product that is downloaded to a memory within a computer system, for example as executable instructions embedded within an internet web site. In this embodiment, the endpoint device 108 comprises the computer system.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for determining whether a streaming connection is active, the method comprising:
   receiving a first heartbeat packet from an endpoint device through which the streaming connection is established, wherein the first heartbeat packet indicates that the streaming connection is active;
   waiting to receive a secure stop event from the endpoint device, the secure stop event distinct from the first heartbeat packet and indicating that the endpoint device has released a digital rights management (DRM) license corresponding to content being accessed via the streaming connection;
   responsive to determining that no additional heartbeat packets have been received from the endpoint device and that the secure stop event was not received, determining that the streaming connection is inactive;
   responsive to determining that a secure stop event has been received from the endpoint device, computing a time difference between when the secure stop event was received and when the first heartbeat packet was received; and
   responsive to determining that the elapsed time exceeds a predetermined threshold amount of time, enforcing a first security policy for an application through which the streaming connection was established, such that the active streaming connections established through the application are not marked as inactive until respective secure stop events are received.

2. The method of claim 1, further comprising transmitting, to the endpoint device, the DRM license associated with the content being accessed via the streaming connection.

3. The method of claim 2, wherein the secure stop event is transmitted by the endpoint device when the DRM license is released.

4. The method of claim 1, wherein the first heartbeat packet is associated with a time stamp that indicates when the first heartbeat packet was transmitted by the endpoint device.

5. The method of claim 4, wherein the first heartbeat packet includes a unique identifier associated with the streaming connection.

6. The method of claim 4, wherein determining that no additional heartbeat packets have been received from the endpoint device comprises identifying the time stamp associated with the first heartbeat packet.

7. The method of claim 6, wherein determining that no additional heartbeat packets have been received from the endpoint device and that the secure stop event was not received further comprises:
   computing an elapsed time that indicates a difference between the time stamp associated with the first heartbeat packet and a current timestamp; and
   upon determining that the elapsed time is greater than a predetermined threshold time period, determining that the streaming connection is inactive.

8. A non-transitory computer readable medium storing instructions that, when executed by a processor, cause the processor to determine whether a streaming connection is active, by performing the steps of:
    receiving a first heartbeat packet from an endpoint device through which the streaming connection is established, wherein the first heartbeat packet indicates that the streaming connection is active;
    waiting to receive a secure stop event from the endpoint device, the secure stop event distinct from the first heartbeat packet and indicating that the endpoint device has released a digital rights management (DRM) license corresponding to content being accessed via the streaming connection;
    responsive to determining that no additional heartbeat packets have been received from the endpoint device and that the secure stop event was not received, determining that the streaming connection is inactive;
    responsive to determining that a secure stop event has been received from the endpoint device, computing a time difference between when the secure stop event was received and when the first heartbeat packet was received; and
    responsive to determining that the elapsed time exceeds a predetermined threshold amount of time, enforcing a first security policy for an application through which the streaming connection was established, such that the active streaming connections established through the application are not marked as inactive until respective secure stop events are received.

9. The non-transitory computer readable medium of claim 8, further comprising transmitting, to the endpoint device, the DRM license associated with the content being accessed via the streaming connection.

10. The non-transitory computer readable medium of claim 8, wherein the first heartbeat packet is associated with a time stamp that indicates when the first heartbeat packet was transmitted by the endpoint device.

11. The non-transitory computer readable medium of claim 10, wherein the first heartbeat packet includes a unique identifier associated with the streaming connection.

12. The non-transitory computer readable medium of claim 10, wherein determining that no additional heartbeat packets have been received from the endpoint device comprises identifying the time stamp associated with the first heartbeat packet.

13. The non-transitory computer readable medium of claim 12, wherein determining that no additional heartbeat packets have been received from the endpoint device and that the secure stop event was not received further comprises:
    computing an elapsed time that indicates a difference between the time stamp associated with the first heartbeat packet and a current timestamp; and
    upon determining that the elapsed time is greater than a predetermined threshold time period, determining that the streaming connection is inactive.

\* \* \* \* \*